United States Patent Office

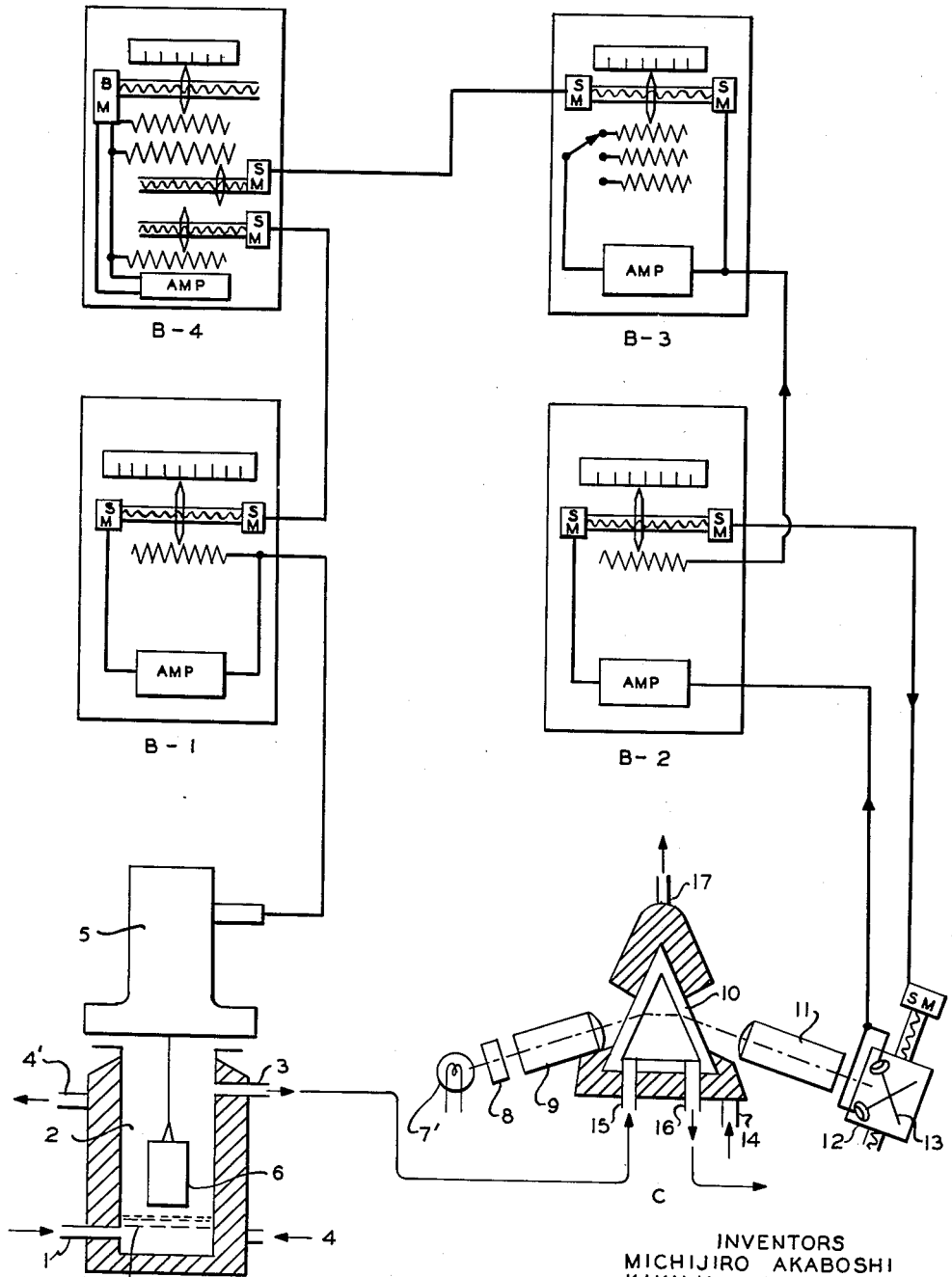

3,090,222
Patented May 21, 1963

3,090,222
APPARATUS FOR CONTINUOUS MEASUREMENT OF DEGREE OF POLYMERIZATION
Michijiro Akaboshi, Toyonaka City, and Kikuji Uragami and Kensuke Okuma, Toyama City, Japan, assignors to Kurashiki Rayon Co., Ltd., Kurashiki-shi, Japan, a corporation of Japan
Filed Feb. 17, 1960, Ser. No. 9,266
4 Claims. (Cl. 73—53)

The present invention relates to an apparatus for continuously measuring the degree of polymerization of a polymer in a polymer solution. Although not limited thereto, the apparatus of the present invention is especially useful for continuously determining the degree of polymerization of polyvinyl acetate formed during the solution polymerization of vinyl acetate.

Various methods were known in the prior art for measuring the polymerization degree of a polymer. However, such methods generally involved computing this degree of polymerization from the viscosity of a solution of a known polymer concentration prepared by dissolving a dry sample of polymer. The measurements of degree of polymerization customarily took at least several hours for completion.

It is an object of this invention to provide an improved apparatus which is especially adapted for continuously measuring the degree of polymerization of polymers in a solution of polymeric material.

Other objects will be apparent from the following description of the present invention.

The accompanying drawing illustrates schematically an embodiment of the apparatus of the instant invention.

Broadly, the apparatus of the present invention comprises a continuous viscometer and a continuous refractometer together with balancing and recording means for converting the viscosity and refractive index of a polymer solution into a measure of the polymer molecular weight. For a particular polymer solution, a change in refractive index indicates a change in the concentration of solution components. The concentration of the polymer in a polymer solution can be determined by refractive index change. Where both the polymer solution viscosity and the polymer concentration in the solution are known, the degree of polymerization of the polymer can be calculated knowing various constants inherent to the particular system. The present invention provides an apparatus for continuously determining the polymer degree of polymerization for a polymer solution.

Referring now to the accompanying drawing, A represents a continuous viscometer. Preferably, A represents a rotary viscometer with a synchronous motor adapted to convert rotary torque into a resistance signal which is transmitted to automatic balance B-1. Suitable commercial viscometers, e.g. the Brookfield Viscometran, are available. The solution enters zone 2 of the viscometer through line 1. The polymer solution sample is filtered by filtering screen 7 and leaves the viscometer through outlet 3. The solution in zone 2 of the viscometer is maintained at constant temperature by means of indirect heat exchange with water entering through 4 and leaving through 4'. Rotor or spindle 6 is driven by synchronous motor 5. The viscometer measures the angular lag of the rotor or spindle behind the motor, which angular lag is proportional to the viscosity of the solution. The angular lag is made proportional to a resistance in the viscometer by known means. The resistance signal is transmitted to automatic balance B-1 wherein the signal is amplified and translated into mechanical displacement by means of a selsyn motor as shown corresponding to the resistance measured in viscometer A. A scale is provided in balance B-1 from which the viscosity of the polymer solution can be directly read. By means of selsyn motors, as indicated in the drawing, the displacement is transmitted to balancing meter B-4.

After leaving viscometer A, the polymer solution is passed to refractometer C. Preferably refractometer C comprises a liquid filled prism cell refractometer consisting of light source 7', filter 8, collimator 9, prism cell 10, telescope 11, and photo cell 12. Angle mirrors 13 are positioned within the photo cell 12. The polymer solution passing through prism cell 10 by means of inlet 15 and outlet 16 is maintained at constant temperature by indirect heat exchange with water entering through 14 and leaving through 17. Refractometer C is adapted to translate changes in the light refraction of the polymer solution into displacement motion. When the light beam is deflected from a pre-established position by change in the solution refractive index, the photo sensing elements in the photo cell transmit a signal to the balance B-2 which signal is translated into displacement motion by the selsyn motor in B-2. The motion in balance B-2 is in turn translated into motion of the photo cell by the selsyn motor combination shown causing the photo cell to change position until no signal from the photo sensitizing elements therein is sent to B-2. The displacement caused by refractive index changes is indicated directly on the scale in B-2 thus enabling a direct reading of refractive index to be made after calibration.

The displacement in balance B-2 corresponding to the refractive index of the polymer solution is converted into a resistance and the signal of this resistance is transmitted to balance B-3.

In a preferred embodiment of the invention, vinyl acetate is polymerized in methanol solution. The polymerization is preferably a partial polymerization resulting in polymer solutions comprised of vinyl acetate, polyvinyl acetate, and methanol. In automatic balance B-3, the effect of the third component, in the preferred case methanol, is taken into consideration in determining polymer concentration in the solution. The balance B-3 is preset depending upon the third component, so that the effect of this third component is combined with the resistance signal from B-2 in order to give a polymer concentration measurement. Various resistances can be provided as indicated in balance B-3 depending upon the components of the polymer solution. The resistance signal from B-2 is modified by the effect of the third solution component in balance B-3, and the resulting signal is translated into mechanical displacement by the selsyn motor in balance B-3. The scale provided with balance B-3 enables a direct reading to be made of polymer concentration. The displacement from balance B-3 is transmitted by selsyn motors to balance B-4.

In balance B-4, the displacements are reconverted into functional resistances corresponding to the viscosity of the polymer solution and to the polymer concentration in the polymer solution. These functional resistances are combined in accordance with the relation which exists between the viscosity of the polymer solution, the polymer concentration in the polymer solution and the polymer degree of polymerization. The combined functional resistances are translated into displacement by the balancing motor in balance B-4. A scale is provided in balance B-4 which enables a direct reading of the degree of polymerization of the polymer to be obtained.

Using the apparatus of the present invention, the degree of polymerization of a polymer in a polymer solution can be continuously computed and recorded. Various process changes which are indicated as necessary from this continuous degree of polymerization determination can be made manually or automatically as required. The apparatus of the present invention is useful for a variety of applications, although its preferred use is in determining the degree of polymerization of polyvinyl acetate during solution polymerization of vinyl acetate. In general, the present inventive apparatus is made up of known individual components. However, these components are combined to produce a new and useful overall apparatus.

An example of a system where the apparatus of the invention is most advantageously employed is measuring the degree of polymerization of polyvinyl acetate in a solution containing vinyl acetate and polyvinyl acetate and containing by weight 15 to 20 percent methanol as the third component. The physical conditions and ranges which are illustrative of those obtained are as follows:

| | |
|---|---|
| Measuring temperature | At 30° C. |
| Viscosity | 20 to 100 poises. |
| Specific gravity | 0.9. |
| Refractive index | 1.39 to 1.42. |
| Polymerization degree | 2000 to 2500. |

The degree of polymerization of the polymer is related to the viscosity of the polymer solution and to the polymer concentration in the polymer solution in accordance with the following equation:

$$\frac{Y}{Y \text{ sol.}} = \left\{ 1 + \frac{A}{k} \cdot e^{\frac{B}{t}} \cdot P^{\alpha}(1+C)C \right\}^k$$

wherein Y sol. designates the viscosity of the solvent and A, k, B, α, and T are constants inherent to the system, Y is measured solution viscosity, C is measured polymer concentration, and P is polymer degree of polymerization. The constants inherent to a particular system can be determined by measurements employing known degree of polymerization polymer and solutions of known polymer concentration. In accordance with the relationships between the various values, the automatic balances B-3 and B-4 can be preset by known means to combine the various functional resistances and give the desired determination.

If desired, in another embodiment of the present invention, other physical quantities such as dielectric constants and dielectric losses of a polymer solution can be measured and translated into polymer concentration in place of the refractive index measuring system hereinabove described.

In the accompanying drawing, SM refers to a selsyn motor, BM refers to a balancing motor, and Amp. refers to an amplifier.

We claim:

1. An apparatus for continuously measuring the degree of polymerization of the polymer in a polymer solution comprising a continuous viscometer adapted to measure the viscosity of said polymer solution, a continuous refractometer adapted to continuously measure the refractive index of said polymer solution, means for continuously converting the refractive index measurement into a measurement of polymer concentration in the polymer solution, and means for continuously combining the viscosity measurement and concentration measurement into a measurement of the polymer degree of polymerization.

2. An apparatus for continuously measuring the degree of polymerization of the polymer in a polymer solution which comprises a continuous rotary viscometer adapted to measure the viscosity of said polymer solution and to convert the said viscosity into an electrical resistance, a continuous refractometer adapted to measure the refractive index of the polymer solution and to convert the refractive index measurement into an electrical resistance, means for converting the electrical resistance corresponding to the refractive index into an electrical resistance corresponding to the polymer concentration in the polymer solution, and means for combining the electrical resistance corresponding to the viscosity of the solution with the electrical resistance corresponding to the polymer concentration into an electrical resistance which is a measurement of the polymer degree of polymerization.

3. A process for continuously measuring the degree of polymerization of the polymer in a polymer solution as said polymer is formed from a polymerizable monomer, said polymer being polyvinyl acetate and said monomer being vinyl acetate, which comprises continuously measuring the viscosity of said polymer solution, continuously measuring the refractive index of said polymer solution, continuously converting the refractive index measurement into a measurement of polymer composition in the polymer solution, and continuously combining the viscosity measurement and the polymer concentration measurement into a measurement of the degree of polymerization of the polymer.

4. A process for continuously measuring the degree of polymerization of the polymer in a polymer solution as said polymer is formed from a polymerizable monomer, said polymer being polyvinyl acetate and said monomer being vinyl acetate, which comprises continuously measuring the viscosity of said polymer solution and converting said viscosity measurement into an electrical resistance, continuously measuring the refractive index of said polymer solution and converting the refractive index measurement into an electrical resistance, converting the electrical resistance corresponding to the refractive index into an electrical resistance corresponding to the polymer concentration in the polymer solution, and combining the electrical resistance corresponding to the viscosity of the solution with the electrical resistance corresponding to the polymer concentration into an electrical resistance which is a measurement of the degree of polymerization of said polymer.

References Cited in the file of this patent

UNITED STATES PATENTS

| | | |
|---|---|---|
| 2,357,003 | Hurndall | Aug. 29, 1944 |
| 2,665,197 | Rowland | Jan. 5, 1954 |
| 2,780,131 | Lanneau et al. | Feb. 5, 1957 |
| 2,960,861 | Copland et al. | Nov. 22, 1960 |

OTHER REFERENCES

Publication: Review Scientific Instruments, vol. 26, #11, November 1955. Pages 1007–1017. Article by H. G. Jerrard. (Copy in 73–60.)